L. GUDEMAN.
JUNCTION OR TERMINAL BOX.
APPLICATION FILED JUNE 8, 1910.
990,353.
Patented Apr. 25, 1911.
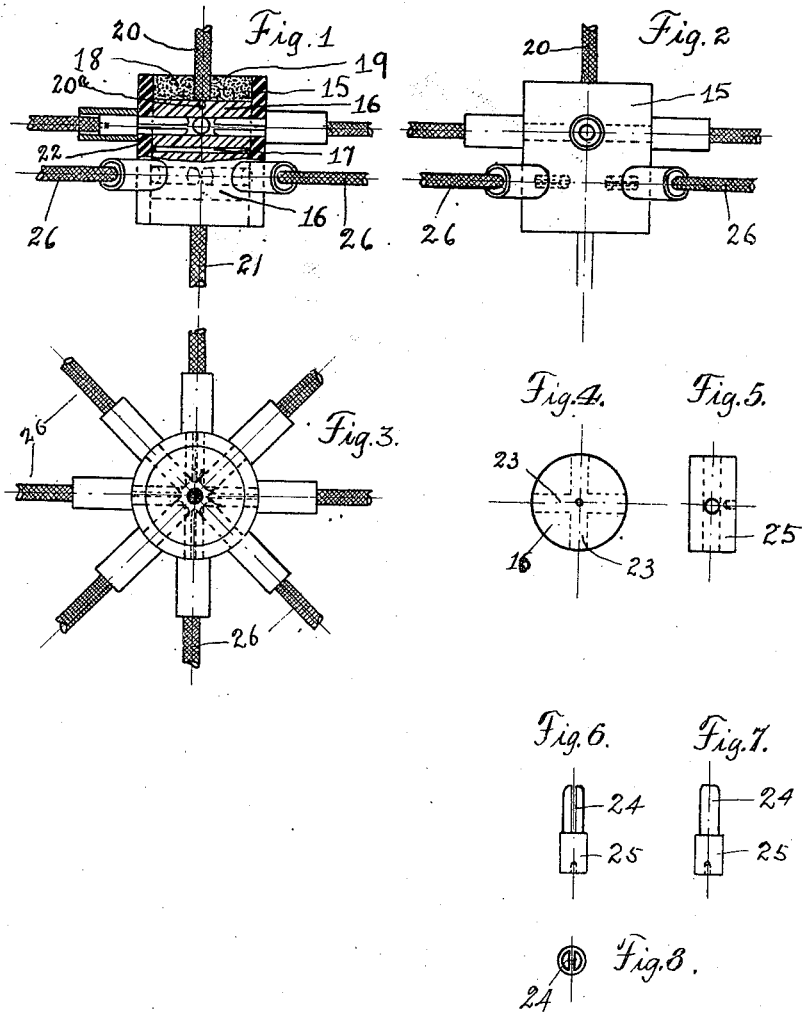

UNITED STATES PATENT OFFICE.

LEO GUDEMAN, OF NEW YORK, N. Y.

JUNCTION OR TERMINAL BOX.

990,353.  Specification of Letters Patent.  Patented Apr. 25, 1911.

Application filed June 8, 1910. Serial No. 565,678.

*To all whom it may concern:*

Be it known that I, LEO GUDEMAN, citizen of the United States of America, residing at New York city, New York, have invented certain new and useful Improvements in Junction or Terminal Boxes, of which the following is a specification.

My invention relates to an improved form of junction or terminal box for electrical equipments.

The primary object of the invention is to provide a portable junction box, which owing to the simplicity of the organization of its constituent parts may be cheaply manufactured and is not likely to get out of order.

A further object is to so construct the box that it may be made capable of receiving any desired number of plugs or other terminals used for completing an electric circuit.

Although the invention is adapted for use in any connection where junction boxes are required, it is of particular advantage in installations where a portable junction box is convenient, for example in stringing lamps on Christmas tree outfits and the like.

The invention is illustratively exemplified in the accompanying drawing, wherein—

Figure 1 is an elevational view partly in section of a junction box embodying my invention and having a number of plugs inserted therein; Fig. 2 is a side elevational view thereof; Fig. 3 is an end view thereof; Fig. 4 is a top plan view of a metallic conducting block; Fig. 5 is a side elevational view of the sleeve of a terminal plug; Figs. 6, 7 and 8 are detail views of the plug.

Referring by reference characters to the drawing 15 designates a sleeve, preferably cylindrical in form, and made of a material such as compressed fiber or the like, the sleeve being designed to inclose blocks 16 of metallic conducting material such as copper. There are preferably two such blocks employed, and they are separated by a non-conducting layer 17 consisting by preference of paraffin. In the form of invention shown in Figs. 1 and 2, the exposed surface of each copper block is covered with packed insulation 18 over which I place a layer of pitch 19 or the like. Passing through the pitch and insulation are the incoming wire cable 20 and the outgoing wire cable 21, each thereof having its terminals $20^a$ bare and secured to the copper blocks as by soldering or the like. The sleeve 15 has a plurality of perforations 22 in line with passages 23 in the copper blocks to receive the split ends 24 of plugs which have sleeves 25 in which the ends of wire cables 26 are suitably secured. When the plugs are forced into the openings in the sleeve 15 and blocks 16 a circuit is coupled through the plug, the copper block and either the incoming or outgoing wire. In the form of invention shown in Figs. 1 to 3 the interior diameter of the sleeve 15 is very slightly less than the exterior diameter of the blocks 16 and I build up the junction box by first driving one copper block into the sleeve, then placing the paraffin layer 17 in position, then driving in the other copper block, attaching the terminals $20^a$ to the blocks and finally filling in the insulation 18 and running the pitch layer 19 over the exposed insulation surface.

It will be understood that I may, if desired, increase the number of copper blocks for each junction box, and may also make the latter of any diameter to provide room for a suitable number of openings to receive the plugs 24—25.

Having thus described my invention what I claim as new and desire to secure by Letters Patent is:—

1. A junction box comprising the combination with an exterior sleeve provided with suitable plug openings, of a plurality of metallic conducting blocks superposed in the longitudinal direction of the sleeve and having passages in line with the openings in the sleeve.

2. A junction box comprising the combination with an exterior fiber sleeve provided with suitable plug openings, of a plurality of copper blocks, said blocks being superposed in the longitudinal direction of said sleeve and being provided with passages in line with the openings in said sleeve, within said sleeve, and a layer of non-conducting material between said blocks.

3. A junction box comprising the combination with a fiber sleeve having suitable openings therein, of a plurality of copper blocks inclosed by said sleeve and having passages therein in line with the openings in the sleeve, said blocks being circular in form and superposed in the longitudinal direction of said sleeve, a layer of non-conducting material between said blocks, and insulating material covering the exposed surfaces of said blocks.

4. A junction box comprising the combination with a fiber sleeve having suitable openings therein, of a plurality of copper blocks inclosed by said sleeve and having passages in line with the openings in the
5 sleeve, said blocks being superposed in the longitudinal direction of said sleeve, a layer of non-conducting material between said blocks, packed asbestos covering the exposed surfaces of said blocks, conducting wires secured to said blocks, and a layer of pitch 10 over the packed asbestos.

In testimony whereof I have affixed my signature in presence of two witnesses.

LEO GUDEMAN.

Witnesses:
  OTTO MUNK,
  CLARISSA FRANCK.